E. HOXIE.
STOP-COCK.

No. 192,511. Patented June 26, 1877.

Witnesses
C. Pierson
H. E. Bathrick

Inventor;
Edmund Hoxie
per Edw. Dummer
Atty.

UNITED STATES PATENT OFFICE.

EDMUND HOXIE, OF NEWBURYPORT, MASSACHUSETTS.

IMPROVEMENT IN STOP-COCKS.

Specification forming part of Letters Patent No. 192,511, dated June 26, 1877; application filed September 4, 1876.

*To all whom it may concern:*

Be it known that I, EDMUND HOXIE, of Newburyport, in the county of Essex and State of Massachusetts, have invented a new and useful Improvement in Stop-Cocks, which improvement is fully set forth in the following specification, reference being had to the accompanying drawings.

My invention relates to that class of stop-cocks in which the passage-way is opened or closed by revolving the valve; and it has for its object, first, to raise the valve from or press the valve to its seat by an operation and movement separate from, and independent of, that of revolving the valve to position for opening or closing; secondly, to so guide the valve in its direct movement from its seat, and hold it in position while being revolved, as to prevent unnecessary wear; thirdly, to raise the valve from or press it to its seat by a combination of a right and left threaded screw; fourthly, to so arrange the yoke as to form stops for the hand-lever, and to indicate the proper positions of the valve.

Figure 1:
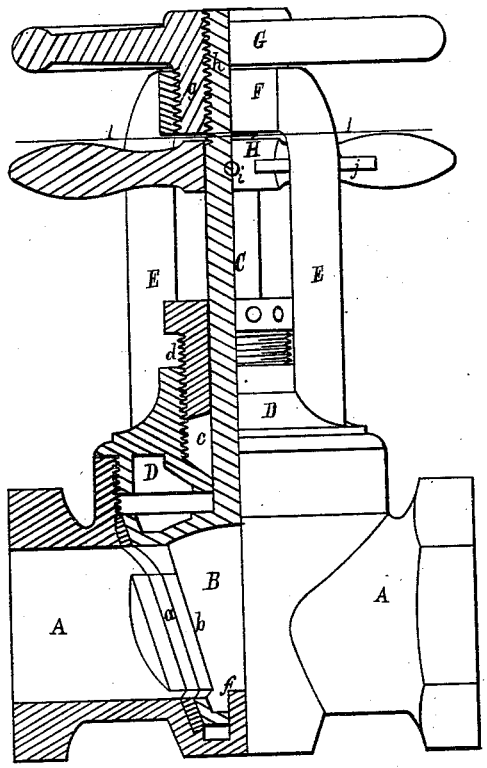
Figure 3:
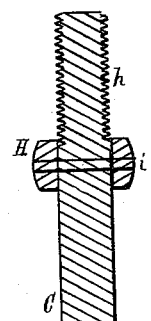
Figure 2:
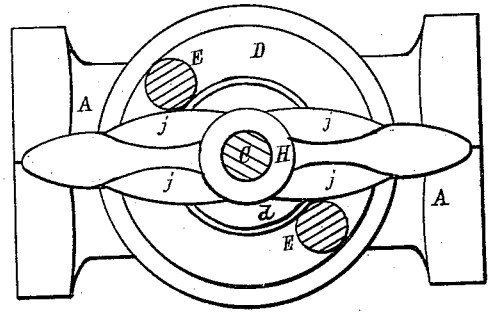
Figure 2:
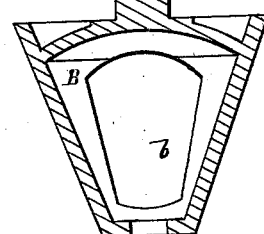

In the drawings, Figure 1 represents a side view of a stop-cock embodying my invention, one-half being in section, and the valve shown set for a free passage-way. Fig. 2 is a horizontal section taken on line 1 1 of Fig. 1, and showing plan of parts below that line. Fig. 3 shows a section of the valve removed from the body of the stop-cock and turned from the position shown in Fig. 1 to that when the passage-way is closed.

A A are the induction and eduction nozzles or pipes. $a$ is the valve-seat. This valve-seat may be made of soft metal, and formed solid with the body of the stop-cock, as shown. B is the valve, formed tapering, as shown, to fit the seat $a$, and having the openings $b$ on opposite sides, so located and formed that in the position shown in Fig. 1 there is an open and free passage-way through the cock, but that a quarter-turn of the valve will close the passage-way. C is the valve-stem, which, joined firmly to the valve, extends through the cap D, packing at $c$, and stuffing-box $d$, and has at the upper end a thread, $h$, cut thereon. The valve B is further guided and held in central position by the guide-pin $f$, which, being held firmly, slides in the lower end of the valve.

To the cap D is joined the yoke, composed of the uprights E and cross-piece F. In the cross-piece F is a threaded opening, $g$, into which the extended hub of the hand-wheel G screws.

The hub of hand-wheel G also screws onto the valve-stem C at $h$.

Either one of the screws $g$ and $h$ may be right and the other left threaded; but I prefer that the screw $h$ of the valve-stem should be left-threaded, and the screw $g$ on the hub of hand-wheel right-threaded.

A hand-lever, H, is fastened firmly to the valve-stem by the pin $i$, and is formed with flanges $j$ on the sides. The uprights E are so located that when the valve is set for opening or closing the lever H will bear against the standards E.

Thus, these standards will not only be the means of stopping the valve in extreme positions for opening and shutting, but indicate the position of valve.

When the stop-cock is closed, and the valve pressed to its seat, the first operation for opening is to turn the hand-wheel G, by which, by the screws $g$ and $h$, the valve is raised directly from its seat; then, by means of the hand-lever H, the valve is revolved without friction against its seat.

When the valve is raised from its seat any side pressure against the same cannot cause it to bear against and wear one side of the valve-seat, since it is so securely held by the guide-pin $f$.

By the screws $g$ and $h$ the valve may be pressed most closely to its seat when closed.

Another advantage consists in having these screws outside of the body of the stop-cock.

I claim as my invention—

1. The valve B, having the stem C and lever H, in combination with the yoke E F, the screws $g$ and $h$, and hand-wheel G, substantially as hereinbefore specified.

2. The valve B, having the stem C, in combination with the yoke E F, screws $g$ and $h$, and hand-wheel G, all constructed, arranged, and operated substantially as hereinbefore set forth.

3. The valve B, having the stem C, in combination with the yoke E F and lever H, having the flanges $j$, substantially as and for the purpose hereinbefore specified.

EDMUND HOXIE.

Witnesses:
EDW. DUMMER,
CLAUD PIERSON.